US011964326B2

(12) United States Patent
Sallot

(10) Patent No.: US 11,964,326 B2
(45) Date of Patent: Apr. 23, 2024

(54) SOLUTION FOR MANUFACTURING A ONE-PIECE BLADED DISC

(71) Applicant: SAFRAN, Paris (FR)

(72) Inventor: Pierre Jean Sallot, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/783,226

(22) PCT Filed: Dec. 10, 2020

(86) PCT No.: PCT/FR2020/052374
§ 371 (c)(1),
(2) Date: Jun. 7, 2022

(87) PCT Pub. No.: WO2021/123576
PCT Pub. Date: Jun. 24, 2021

(65) Prior Publication Data
US 2023/0017699 A1    Jan. 19, 2023

(30) Foreign Application Priority Data

Dec. 20, 2019   (FR) ...................................... 1915076

(51) Int. Cl.
*B22F 5/04*   (2006.01)
*B22F 3/105*   (2006.01)
(Continued)

(52) U.S. Cl.
CPC ................ *B22F 5/04* (2013.01); *B22F 3/105* (2013.01); *B22F 5/009* (2013.01); *B22F 7/064* (2013.01);
(Continued)

(58) Field of Classification Search
CPC .. B22F 3/105; B22F 2003/1051; B22F 5/009; B22F 5/04; B22F 7/08; F05D 2230/22; F01D 5/30
See application file for complete search history.

(56) References Cited

U.S. PATENT DOCUMENTS 3,857,436 A * 12/1974 Petrov ................... B22D 27/045
                                                              164/122.2
4,063,939 A    12/1977 Weaver et al.
(Continued)

FOREIGN PATENT DOCUMENTS

EP    0 073 651 A1    3/1983
EP    2 428 309 A2    3/2012
(Continued)

OTHER PUBLICATIONS

International Search Report as issued in International Patent Application No. PCT/FR2020/052374, dated Mar. 18, 2021.

*Primary Examiner* — Sally A Merkling
*Assistant Examiner* — Sean P. O'Keefe
(74) *Attorney, Agent, or Firm* — Pillsbury Winthrop Shaw Pittman LLP

(57) ABSTRACT

A method for manufacturing an integrally formed bladed disk of a turbomachine, includes manufacturing a plurality of blades, the blades including a root and a profiled portion; and spark plasma sintering the blades with a metal powder, the blades being angularly distributed over a contour of an annular spark plasma sintering mold, the root of the blades being embedded into the metal powder, the profiled portion of the blades protruding from the metal powder radially outwardly.

6 Claims, 4 Drawing Sheets

(51) Int. Cl.
*B22F 5/00* (2006.01)
*B22F 7/06* (2006.01)
*F01D 5/30* (2006.01)

(52) U.S. Cl.
CPC ........ *F01D 5/30* (2013.01); *B22F 2003/1051* (2013.01); *B22F 2998/10* (2013.01); *F05D 2230/22* (2013.01)

(56) References Cited

U.S. PATENT DOCUMENTS

| | | | | |
|---|---|---|---|---|
| 4,097,276 A | * | 6/1978 | Six | B22F 5/04 416/193 A |
| 4,323,394 A | * | 4/1982 | Hoffmuller | B22F 7/08 419/48 |
| 4,680,160 A | | 7/1987 | Helmink | |
| 2013/0344347 A1 | * | 12/2013 | Hugot | B22F 7/064 419/8 |
| 2016/0319666 A1 | * | 11/2016 | Blumer | B23P 15/006 |

FOREIGN PATENT DOCUMENTS

| | | |
|---|---|---|
| FR | 2 317 502 A1 | 2/1977 |
| FR | 3 048 630 A1 | 9/2017 |
| JP | H05-98316 A | 4/1993 |
| WO | WO 2012/120231 A1 | 9/2012 |

\* cited by examiner

[Fig. 1]
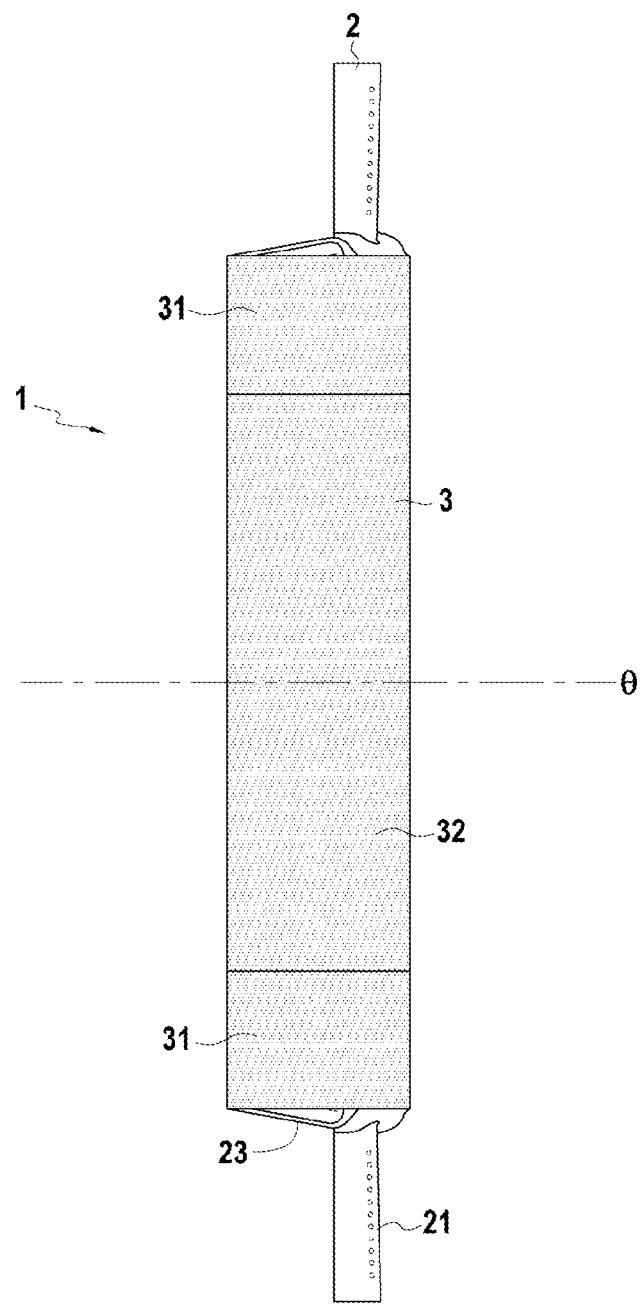

[Fig. 2]
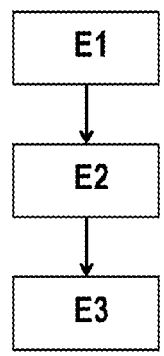
[Fig. 3]
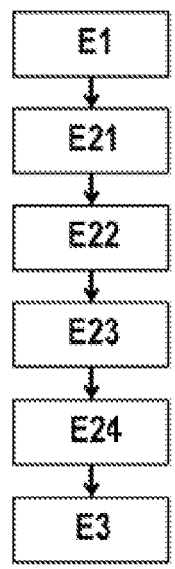

[Fig. 4]
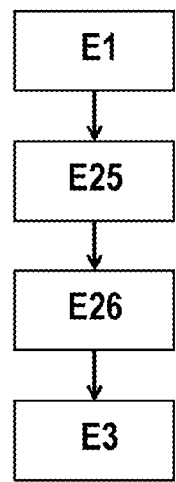
[Fig. 5]
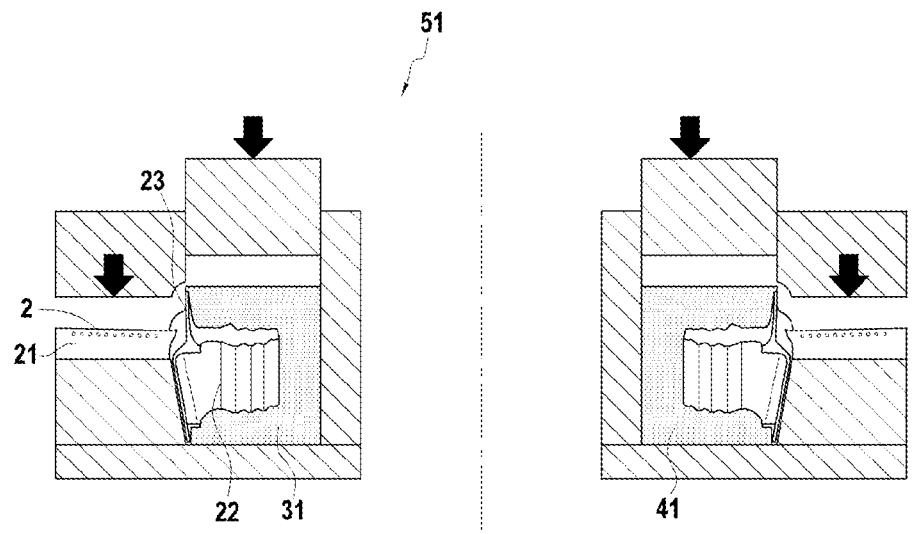

[Fig. 6]
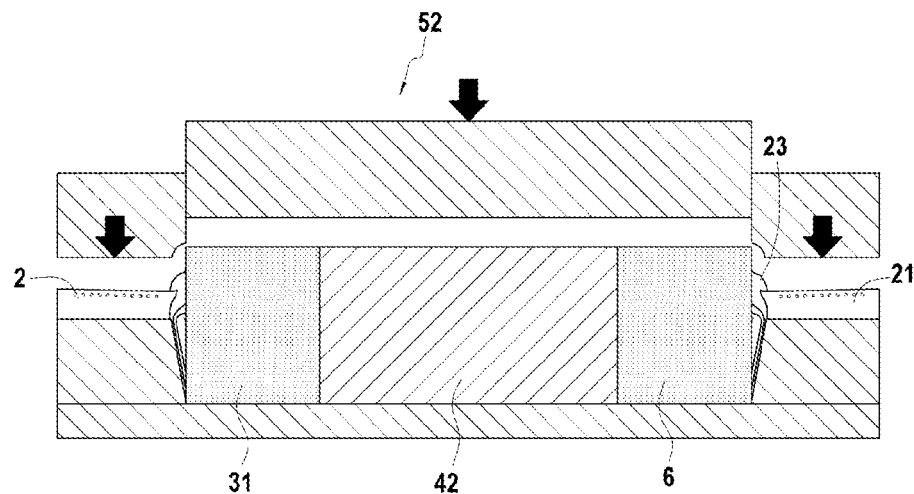

SOLUTION FOR MANUFACTURING A ONE-PIECE BLADED DISC

CROSS-REFERENCE TO RELATED APPLICATIONS

This application is the U.S. National Stage of PCT/FR2020/052374, filed Dec. 10, 2020, which in turn claims priority to French patent application number 1915076 filed Dec. 20, 2019. The content of these applications are incorporated herein by reference in their entireties.

TECHNICAL FIELD

The present invention relates to the general field of the manufacture of an integrally formed bladed disk of a turbomachine.

The invention finds a particularly advantageous application for the manufacture of turbine disks, and in particular high-pressure turbine disks.

Prior Art

The turbine bladed disks of a turbomachine are generally manufactured by producing on the one hand a central hub and on the other hand a plurality of blades, cells being produced on the periphery of the central hub in order to fix the cells on said hub central.

However, such a solution may encounter the following difficulties:
- in order to avoid the appearance of faults during the machining of the cells in the central hub, the latter is dimensioned by increasing the amount of material at the level of the cells, which leads to an increase in the mass of the disk;
- premature wear of the root of the blades may occur due to friction between the root of the blades and the cell of the central hub (fretting);
- a compromise must be found such that the bladed disk is on the one hand resistant to creep, and on the other hand resistant to traction;
- the geometry of the root of the blades must be chosen in order to allow insertion into the cells, thus limiting the possible geometries.

The manufacture of integrally formed bladed disks (BLISK) allows meeting some of these limitations, in particular by eliminating the blading root part. These integrally formed bladed disks (BLISK) are generally manufactured either by machining in the mass of a forged raw material, or by welding of the vanes constituting the blading on a forged disk.

However, such a solution may nevertheless encounter several difficulties. For example, in the case of a machining in the mass, the choice of the constituent material of the vanes is imposed by the material chosen for the disk, thus preventing adapting the material of the vanes to their specific stresses.

In the case of the disk/vanes assembly, the assembled area is often positioned in a critical area which can lead to over-dimensioning the part in order to meet thermomechanical stresses. These methods also often involve a step where the melting of the material occurs, which has a negative impact on the materials.

In addition, in the case of a machining in the mass or in the case of a disk/vanes assembly, the use of monocrystalline or directional solidification vanes is prohibited.

Disclosure of the Invention

The purpose of the present invention is therefore to propose a solution that allows the manufacture of a bladed disk which solves the problems mentioned above.

According to a first aspect, the invention proposes a method for manufacturing an integrally formed bladed disk of a turbomachine, said method comprising the following step:
  manufacturing a plurality of blades, the blades comprising on the one hand a root, and on the other hand a profiled portion; characterized in that the method comprises the following steps:
  spark plasma sintering the blades with a metal powder, the blades being angularly distributed over a contour of an annular spark plasma sintering mold, the root of the blades being embedded into the metal powder, the profiled portion of the blades protruding from the metal powder radially outwardly.

According to one possible characteristic, the blades are monocrystalline.

According to one possible characteristic, the method comprises the following steps:
  placing the blades in a first spark plasma sintering mold which comprises a first metal powder;
  spark plasma sintering the blades with the first metal powder so as to form an intermediate disk;
  placing the intermediate disk in a second spark plasma sintering mold which comprises a second metal powder;
  spark plasma sintering the intermediate disk with the second metal powder.

According to one possible characteristic, the intermediate disk formed by the spark plasma sintering of the blades with the first metal powder comprises a porosity rate comprised between 30% and 10%.

According to one possible characteristic, the method comprises the following step:
  placing the blades in a spark plasma sintering mold which comprises a first metal powder and a second metal powder, the root of the blades being embedded into the first metal powder so that the first metal powder forms an outer portion of a central hub of the bladed disk to be manufactured, the second metal powder being surrounded by the first metal powder so that the second metal powder forms an inner portion of a central hub of the bladed disk to be manufactured;
  spark plasma sintering the blades with the first metal powder and the second metal powder.

According to one possible characteristic, the metal of the first metal powder has a higher creep resistance than that of the metal of the second metal powder.

According to one possible characteristic, the metal of the second metal powder has a higher tensile strength than that of the metal of the first metal powder.

According to one possible characteristic, the method comprises the following step:
  heat-treating the bladed disk formed by the spark plasma sintering of the blades with the metal powder.

According to a second aspect, the invention proposes an integrally formed turbomachine bladed disk obtained by the method according to any one of the preceding characteristics.

According to one possible characteristic, the bladed disk comprises monocrystalline blades and a polycrystalline central hub.

According to a third aspect, the invention proposes a turbomachine comprising an integrally formed bladed disk according to any one of the preceding characteristics.

BRIEF DESCRIPTION OF THE DRAWINGS

Other characteristics and advantages of the present invention will become apparent from the description given below, with reference to the appended drawings which illustrate one exemplary embodiment devoid of any limiting character.

FIG. 1 schematically represents a bladed disk of a turbomachine.

FIG. 2 schematically represents the steps of a method for manufacturing a bladed disk of a turbomachine.

FIG. 3 schematically represents the steps of a method for manufacturing a disk of a turbomachine according to a first possible variant.

FIG. 4 schematically represents the steps of a method for manufacturing a disk of a turbomachine according to a second possible variant.

FIG. 5 schematically represents a sectional view of the spark plasma sintering of a plurality of blades with a first metal powder.

FIG. 6 schematically represents a sectional view of the spark plasma sintering of an intermediate disk with a second metal powder.

DESCRIPTION OF THE EMBODIMENTS

The invention relates to the manufacture of an integrally formed turbomachine bladed disk 1, and in particular an integrally formed turbine bladed disk 1.

The bladed disk may be a high-pressure turbine disk that is to say the turbine located directly downstream of the combustion chamber, or a low-pressure turbine disk that is to say the turbine located downstream of the high-pressure turbine. The invention is particularly suitable for manufacturing a high-pressure turbine bladed disk which comprises uncooled solid blades, that is to say the blades have no inner cooling channels.

The bladed disk 1 is made of metal. It may for example be made of a titanium-based alloy, or of a nickel-based alloy, the alloy being determined according to the conditions of use of the bladed disk 1. In particular, in the context of a high-pressure turbine disk, the nickel-based alloy is advantageous.

The turbomachine is an aircraft turbomachine, such as for example an airplane turbomachine, or for example a helicopter turbomachine. The invention is particularly suitable for manufacturing a high-pressure turbine bladed disk of a helicopter engine.

As illustrated in FIG. 1, a bladed disk 1 is an annular part with an axis 8 which comprises a plurality of blades 2 which are angularly distributed over the contour of a central hub 3. The bladed disk 1 being integrally formed, the blades 2 and the central hub 3 are made in one piece.

As visible in FIGS. 1 and 5, the blades 2 each comprise on the one hand a profiled portion 21 which has an intrados and an extrados, and on the other hand a root 22 which is fixed to the central hub 3, the profiled portion 21 and the root 22 being separated by a platform 23 which delimits the air flowpath.

As illustrated in FIG. 2, the method for manufacturing the bladed disk 1 comprises the following steps:

E1: the blades 2 are manufactured, for example in lost wax casting. The blades 2 are manufactured according to their final shape that is to say they comprise the profiled portion 21 and the root 22, as well as the platform 23. The blades 2 are metal blades.

E2: the blades 2 are then sintered according to spark plasma sintering with a metal powder in a spark plasma sintering mold that has the shape of the bladed disk 1 to be produced. In order to give bladed disk 1 its shape, the blades 2 are angularly distributed over the contour of the mold as illustrated in FIG. 5 or 6. The root 22 of the blades 2 is embedded into the metal powder so that the blades 2 are thus fixed to the central hub 3 which will be formed by the metal powder 2 at the end of the sintering step. The profiled portion 21 of the blades 2 is for its part directed radially outwardly and is located out of the metal powder, thus protruding. The metal powder can for example be a titanium-based alloy, or a nickel-based alloy, the composition of the metal powder being chosen according to the characteristics desired for the bladed disk 1 to be manufactured.

The fact of manufacturing the bladed disk 1 by spark plasma sintering of the blades 2 with a metal powder intended to form the central hub 3 allows forming an integrally formed bladed disk 1, thus avoiding wear by friction between the blades 2 and the central hub 3.

Furthermore, the fact that the sintering is a spark plasma sintering allows avoiding destabilizing the metallurgical structures of the different alloys used to form the blades 2 and the central hub 3. In particular, the use of a spark plasma sintering allows avoiding recrystallization of the blades 2 when the manufactured blades 2 are monocrystalline. Thus, the bladed disk 1 can comprise monocrystalline blades 2 and a polycrystalline central hub 3, while being an integrally formed bladed disk. This is in particular due to spark plasma sintering densification cycles which are short, for example lasting less than 15 minutes.

In addition, the shape of the root 22 of the blades 2 is no longer subject to the stress of insertion into a cell machined in the central hub 3, thus making it possible to use geometries for the root 22 of the blades 2 ensuring better rigidity of fixing with the central hub 3.

Also advantageously, the central hub 3 does not need to be machined to form cells intended to receive the root 22 of the blades 2.

The spark plasma sintering is carried out by compacting the metal powder and the blades 2 and by applying an electric current which passes through the metal powder and the root 22 of the blades 2. The spark plasma sintering mold is therefore configured on the one hand to inject and allow the passage of an electric current, and on the other hand to apply a pressure.

At the end of step E2 of spark plasma sintering the blades 2 with the metal powder, the bladed disk 1 comprising the blades 2 angularly distributed about the central hub 3 is formed.

As illustrated in FIG. 1, a heat treatment of the bladed disk 1 can be carried out after the spark plasma sintering of the blades 2 with the metal powder. This heat treatment step E3 is in particular advantageous in order to give the central hub 3 the desired properties. This heat treatment step E3 can be carried out directly in the spark plasma sintering mold, or can be carried out in separate tools. The heat treatment is adapted according to the alloy(s) used for the manufacture of the bladed disk 1. In addition, in the case where the blades 2 are monocrystalline, the heat treatment is adapted in order to avoid recrystallization of said blades 2.

In addition, a step of machining the bladed disk 1 can be carried out at the end of the manufacturing method as a finish, in order for example to adapt the surface condition of the disk. This machining step can in particular be carried out after the heat treatment step E3.

As illustrated in FIGS. 3, 4, 5 and 6, several variants are possible to implement the manufacturing method illustrated in FIG. 1.

According to a first possible variant illustrated in FIGS. 3, 5 and 6, the central hub 3 is manufactured in several spark plasma sintering steps, while according to a second variant illustrated in FIG. 4, the central hub 3 is manufactured in a single spark plasma sintering step.

According to the first variant, after the manufacture of the blades 2, the method comprises the following steps:

E21: the blades 2 are placed in a first spark plasma sintering mold 51, a first metal powder 41 also being located inside said first mold 51. In a similar way to step E2, the root 22 of the blades 2 is embedded into the first metal powder 41, while the profiled portion 21 protrudes out of the first metal powder radially outwardly. The first metal powder 41 is intended to form an outer portion 31 of the central hub 3 located at the level of the roots 22 of the blades 2.

E22: the blades 2 and the first metal powder 41 are sintered according to a spark plasma sintering. An intermediate disk 6 formed only of the blades 2 and of the outer portion 31 of the central hub 3, the intermediate disk 6 thus comprising a hole in its center. The pressure applied by the first mold 51 can be adapted so that the densification of the intermediate disk is only partial. The intermediate disk 6 can for example have a porosity rate comprised between 30% and 10%. The porosity rate may for example be comprised between 25% and 15%. By porosity rate it is understood here the volume of the porosities divided by the total volume of the part. Such a porosity rate allows handling the intermediate disk without risk of rupture.

E23: The intermediate disk 6 is placed in a second spark plasma sintering mold 52, a second metal powder 42 also being disposed inside said second mold 42. The second metal powder 42 is disposed in the hole formed in the center of the intermediate disk 6, and is intended to form an inner portion 32 of the central hub 3 which is surrounded by the outer portion 31.

E24: the intermediate disk 6 and the second metal powder 42 are sintered according to spark plasma sintering, thus making it possible to obtain the bladed disk 1.

The second variant shown in FIG. 4 differs from the first variant of FIG. 3 in that the central hub 3 is manufactured in a single step of spark plasma sintering the blades 2 with simultaneously the first metal powder 41 and the second metal powder 42. According to the second variant shown in FIG. 4, the method comprises the following steps:

E25: the blades 2 are placed in a spark plasma sintering mold inside which the first metal powder 41 and the second metal powder 42 are disposed. The first metal powder 41 is intended to form the outer portion 31 of the central hub 3, and the second metal powder 42 is intended to form the inner portion 32 of said central hub 3. The first metal powder 41 is disposed in the mold in order to cover the root 22 of the blades 2 and to form a ring which surrounds the second metal powder 42.

E26: the blades 2, the first metal powder 41, and the second metal powder 42 are sintered according to a spark plasma sintering.

In the variants described previously, the second metal powder 42 is different from the first metal powder 41. That is to say the compositions of the two metal powders are different, thus making the central hub 3 a multi-material hub. A multi-material central hub 3 allows locally adapting the mechanical characteristics of the central hub 3 according to the encountered stresses. Thus, advantageously, the outer portion 31 of the central hub 3 is adapted to be more resistant to creep, while the inner portion 32 is adapted to be more resistant to traction. The metal of the first metal powder 41 has a higher creep resistance than the metal of the second metal powder 42. Further, the metal of the second metal powder 42 has a higher tensile strength than the metal of the first metal powder 41. According to one possible example, the first metal powder is made of nickel-based superalloy N19, and the second metal powder is made of nickel-based superalloy N18.

According to one possible variant, the central hub 3 can be made of a single material and is manufactured in a step of spark plasma sintering the blades 2 with a single metal powder.

More than two metal powders of different compositions can be used, for example three or four metal powders of different compositions, thus making it possible to carry out other local adaptations of the mechanical properties of the central hub 3.

The invention claimed is:

1. A method for manufacturing an integrally formed bladed disk of a turbomachine, said method comprising:
   manufacturing a plurality of blades, the blades comprising a root and a profiled portion;
   placing the blades in a first annular spark plasma sintering mold which comprises a first metal powder, the blades being angularly distributed over a contour of the first annular spark plasma sintering mold, the root of the blades being embedded into the first metal powder, the profiled portion of the blades protruding from the first metal powder radially outwardly;
   spark plasma sintering the blades with the first metal powder so as to form an intermediate disk;
   placing the intermediate disk in a second spark plasma sintering mold which comprises a second metal powder;
   spark plasma sintering the intermediate disk with the second metal powder,
   the blades being monocrystalline before and after the spark plasma sinterings with the first and second metal powders.

2. The method according to claim 1, wherein the intermediate disk formed by the spark plasma sintering of the blades with the first metal powder comprises a porosity rate comprised between 30% and 10%.

3. The method according to claim 1, wherein the metal of the first metal powder has a higher creep resistance than that of the metal of the second metal powder.

4. The method according to claim 1, wherein the metal of the second metal powder has a higher tensile strength than that of the metal of the first metal powder.

5. The method according to claim 1, further comprising:
   heat-treating the bladed disk formed by the spark plasma sinterings of the blades with the first and second metal powders.

6. A method for manufacturing an integrally formed bladed disk of a turbomachine, said method comprising:
   manufacturing a plurality of blades, the blades comprising a root and a profiled portion;
   placing the blades in an annular spark plasma sintering mold which comprises a first metal powder and a second metal powder, the blades being angularly distributed over a contour of the annular spark plasma sintering mold, the profiled portion of the blades protruding from the first and second metal powders radially outwardly, the root of the blades being embedded into the first metal powder so that the first metal powder forms an outer portion of a central hub of the bladed disk to be manufactured, the second metal powder being surrounded by the first metal powder so that the second metal powder forms an inner portion of the central hub of the bladed disk to be manufactured;

spark plasma sintering the blades with the first metal powder and the second metal powder, the blades being monocrystalline before and after the spark plasma sintering.

* * * * *